(12) United States Patent
Fortuna (10) Patent No.: US 7,036,762 B2
(45) Date of Patent: May 2, 2006

(54) SYSTEM FOR LACING WINDINGS OF ELECTRIC MACHINES

(76) Inventor: Giovanni Fortuna, Via Juvarra No. 7, Rivoli (IT) 10098

(*) Notice: Subject to any disclaimer, the term of this patent is extended or adjusted under 35 U.S.C. 154(b) by 0 days.

(21) Appl. No.: 10/644,436

(22) Filed: Aug. 20, 2003

(65) Prior Publication Data

US 2004/0040143 A1 Mar. 4, 2004

(30) Foreign Application Priority Data

Sep. 4, 2002 (IT) ................................ TO02A0766

(51) Int. Cl.
*H02K 15/09* (2006.01)
(52) U.S. Cl. ...................................... 242/432.4; 29/596
(58) Field of Classification Search .. 242/432.2–432.5; 29/596; 112/470.01, 470.06
See application file for complete search history.

(56) References Cited

U.S. PATENT DOCUMENTS

| 3,659,337 A | | 5/1972 | Gawthrop |
| 3,862,493 A | | 1/1975 | Habegger et al. |
| 3,879,841 A | * | 4/1975 | Mason ......................... 29/596 |
| 3,983,826 A | | 10/1976 | Dunn |
| 4,563,962 A | * | 1/1986 | Muskulus ............... 112/475.08 |
| 4,614,161 A | * | 9/1986 | Frederick ................ 112/470.23 |
| 5,485,670 A | | 1/1996 | Bouman et al. |
| 5,615,472 A | | 4/1997 | Bouman et al. |
| 6,749,144 B1 | * | 6/2004 | Komuro et al. ........... 242/432.5 |
| 6,758,429 B1 | * | 7/2004 | Stratico et al. ........... 242/432.4 |

FOREIGN PATENT DOCUMENTS

EP 1081831 B1 4/2003

\* cited by examiner

*Primary Examiner*—Emmanuel M Marcelo
(74) *Attorney, Agent, or Firm*—Rader, Fishman & Grauer, PLLC (57) ABSTRACT

A method of lacing coils of electric machines by using a needle having an open eye, said needle being movable relative to the coils mounted onto an indexable support, and a feeder of cord, wherein the needle is rotatable about its axis and the feeder is movable about the needle axis at an angular speed twice the needle speed, whereby a wrapping of the cord around the needle is obtained during the radial movement of the latter. An apparatus carrying out the method comprises an eccentric control assembly for the feeder, with two plates slidable on roller bearings in vertical and horizontal direction, respectively. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

9 Claims, 10 Drawing Sheets

Above the coil
FIG. 5A
Below the coil

Towards the stator centre
FIG. 5B
From the stator centre

Clockwise
FIG. 5C
Counterclockwise

SYSTEM FOR LACING WINDINGS OF ELECTRIC MACHINES

TECHNICAL FIELD

The present invention refers to windings of electric machines and more particularly to a method of lacing windings of electric motors.

BACKGROUND OF THE INVENTION

Induction electric motors and generators typically include a stator and a rotor rotatable relative to the stator. The stator comprises a toroidal metal core or body and a plurality of winding coils made of conducting wire, typically copper or aluminum, arranged around the core and capable of generating an electromagnetic field when suitable currents flow therein. The winding coils are generally laced by means of a cord of natural, synthetic or metallic material, in order to improve the winding performance and to avoid possible interference with the moving rotor.

Several techniques and apparatuses for effecting the lacing of stator coils are known, for instance from U.S. Pat. No. 3,659,337, U.S. Pat. No. 3,862,493, U.S. Pat. No. 5,615,472 and U.S. Pat. No. 5,485,670. EP-A-1 081 831 in the name of the same applicant discloses a method and an apparatus for making a self-locking knot at the end of the winding lacing.

The known apparatuses employ a cord feeder associated with a needle, the feeder performing a vertical up and down movement (relative to a stator arranged with vertical axis) and an oscillating movement towards the needle's eye, while the needle hooking the cord and drawing it from the feeder performs both vertical (up and down) movements and radial movements by going into and out of the region defined by the circular perimeter of the stator (more precisely of the coil).

The cord is captured by the open eye of the needle, i.e. by the hook-shaped needle portion (head). The needle, when leaving the region defined by the coil circular perimeter, is rotated in order it does not engage the cord chain of the previous loop, and in order to be positioned again with the hook in the proper orientation for the subsequent cycle.

The known apparatuses allow a satisfactory lacing only for very well formed stator windings, with rather closely angularly spaced slots, that is with a reduced slot pitch.

The stator winding may exhibit irregularities and deformations and, in the known lacing systems, the imperfections of the coil heads to be laced cause a forced deviation of the lacing cord that therefore leaves the area, defined at the initial set-up, foreseen for the engagement between the cord and the needle's eye. Consequently, a lacing stitch can be missed, with the consequent need to stop the apparatus, to make the operator intervene and to discard the stator (which will be recovered later on). This wastes considerable time and labor, which in turn increases the lacing cost.

Moreover, in the known lacing systems, in order to make a synchronized and unidirectional phasing of the various movements necessary to perform the lacing, the indexed rotational movement of the stator presenting the different slot intervals to the needle is unidirectional (either clockwise or counterclockwise, depending on the manufacturer's choices). This gives rise to problems of compatibility of use among apparatuses of different manufacturers.

Lastly, for design reasons, the slots may have a great angular spacing and, under those conditions, typical of the new generation brushless motors, the known methods experience difficulties in correctly performing the lacing.

In the known systems the physical set-up between the needle and the cord feeder is often complex and requires continuous and very precise adjustments to synchronize the meeting or hooking point between the cord feeder and the needle.

SUMMARY OF THE INVENTION

It is an object of the present invention to overcome the limitations and the drawbacks of the prior art and in particular to provide a method and an apparatus for coil lacing in an electric machine, which method and apparatus allow lacing even very irregular coil heads, simplify the set-up operations and securely fasten the lacing cord to the needle's eye, while reducing the component weight and making the movements of said lacing apparatus smoother.

DETAILED DESCRIPTION OF THE PREFERRED EMBODIMENT OF THE INVENTION

Figure 1:
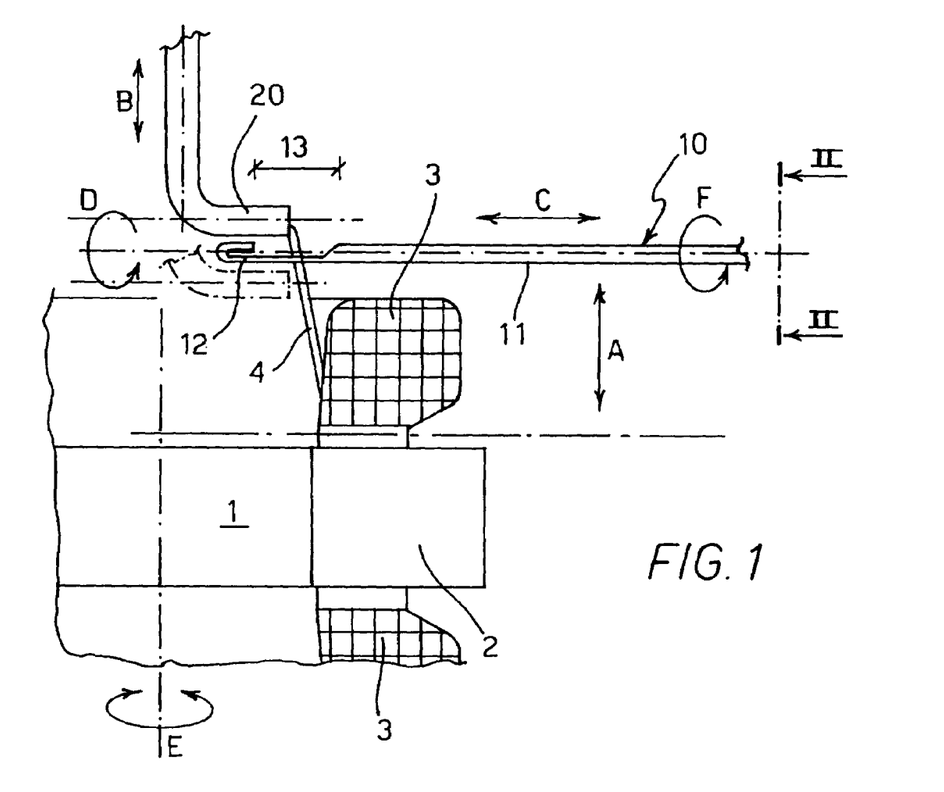
FIG. 1 is a fragmentary cross-sectional view showing part of a stator and the relative positions of the needle and the cord feeder when the needle is above the coil to be laced.

Referring to FIG. 1, stator 1 of an electric motor with cylindrical symmetry is partially shown, the stator comprising a stator core 2 and windings or coils 3. The stator is mounted with vertical axis onto a rotatable support (not shown in the Figure).

A needle 10, the structure of which will be disclosed in more detail below, is radially arranged with respect to stator 1 and it can perform an axial stroke denoted by A, a radial stroke denoted by C and a rotation denoted by F. A tubular cord feeder 20 has an end with axis parallel to the needle axis and dispensing lacing cord 4 that is hooked by the needle and made to wrap around the stator coils. The feeder can perform an axial stroke denoted by B and a rotation, denoted by D, about the needle axis. Lastly, the stator support can be bidirectionally rotationally indexed, as schematically denoted by E, in steps depending on the slot pitch.

Needle 10 comprises a generally cylindrical or conical body 11, of which one end is connected to a driving mechanism (not shown in FIG. 1), whereas the other end is shaped so as to form an open eye with a thinner portion 12, the end section of which is bent into a hook so a to leave a gap or stroke 13 between the hook end and the beginning of the thicker cylindrical portion.

The lacing method with cord wrapping according to the invention will be now described with reference to FIGS. 2A through 2E, which are cross sectional views taken along line II—II in FIG. 1 and centered on the axis of needle 10.

For sake of simplicity, an arrangement is disclosed in which the angular rotation speed of the feeder is constant and twice the angular rotation speed (also constant) of the needle about its axis.

Figure 2A:
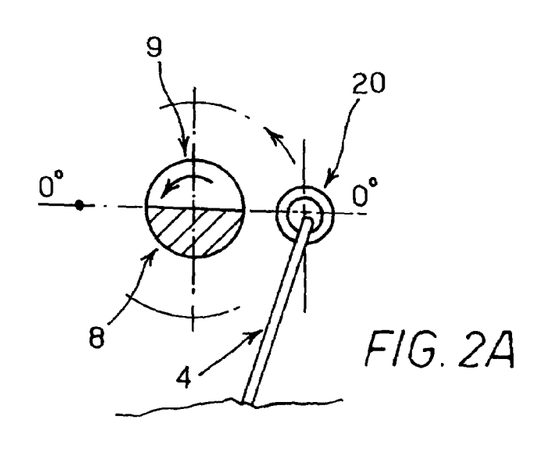
FIGS. 2A through 2E show the winding lacing steps according to the method of the invention when the needle is above the coil.
Figure 2B:
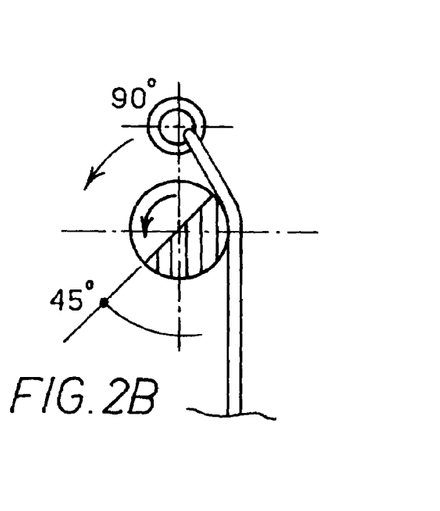
Figure 2C:
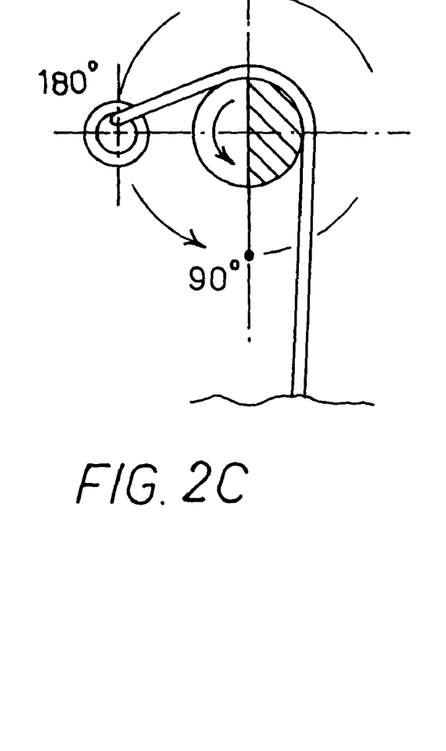
Figure 2D:
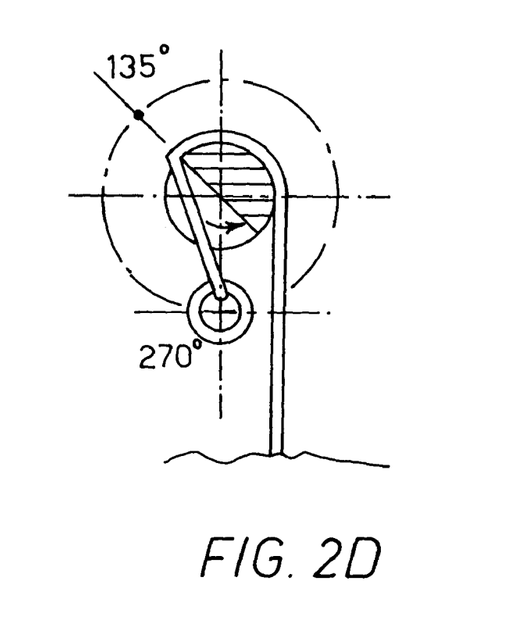
Figure 2E:
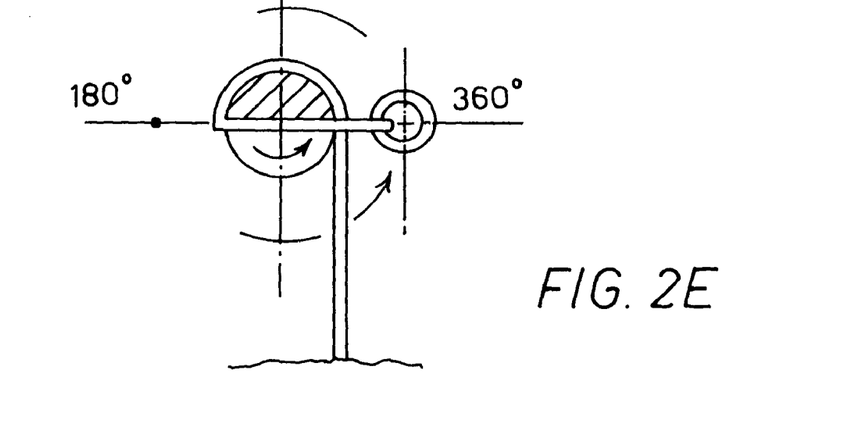

Preferably, the method of the invention requires that the two average speeds be in a 2:1 ratio, so that the positions taken at the end of the cycle are as shown in FIGS. 2A and 2E. Yet it is possible to envisage that the ratio of the rotation speeds of the feeder and the needle is different, or that such speeds are not constant and change for instance depending on the position reached, in particular depending on the orientation of the cord chain being formed, which determines the need of needle return with the eye so oriented that it does not interfere with a link of the previous chain.

Figure 11:
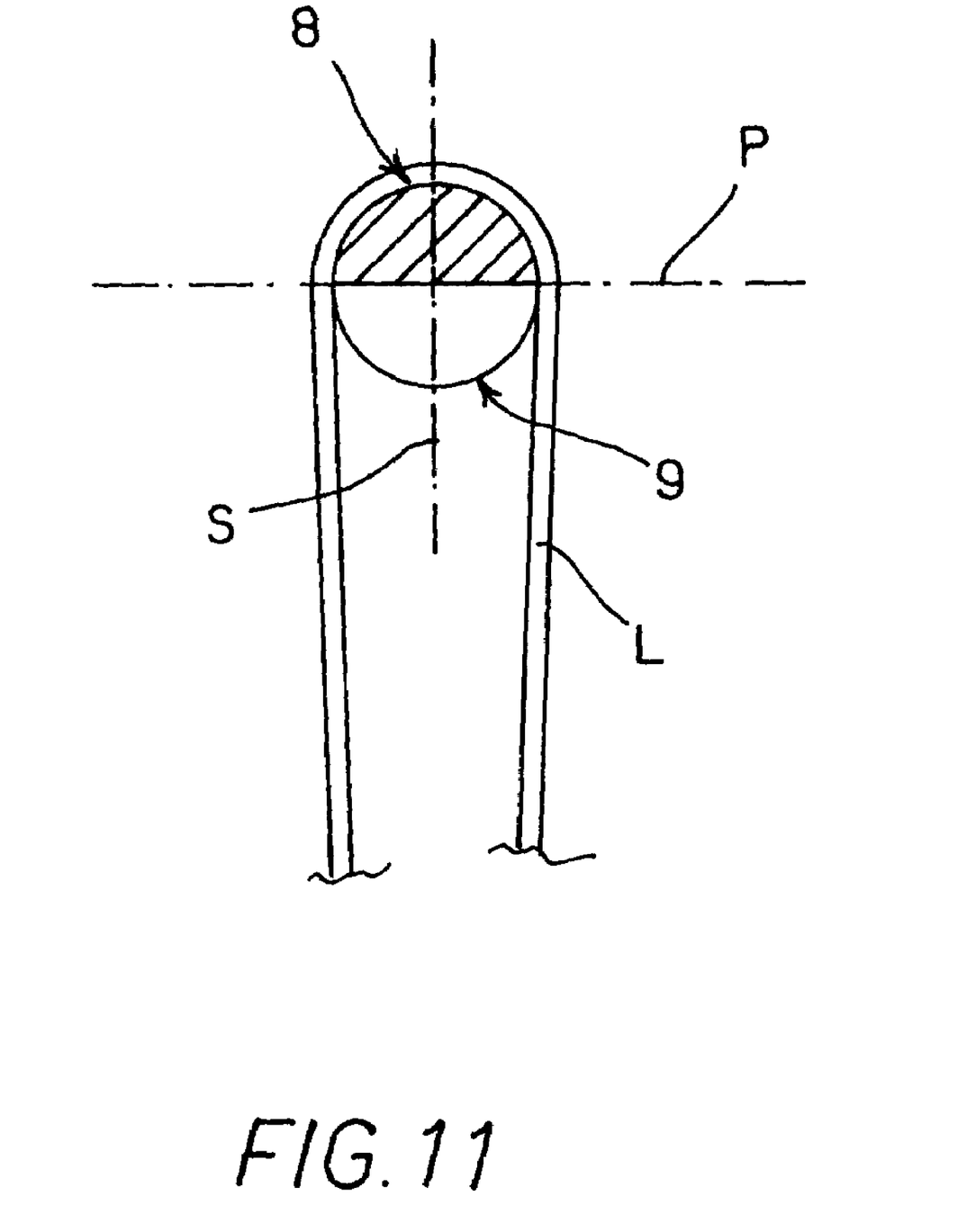
FIG. 11 is a schematic view of the optimum position of the needle's eye at the end of the cord capture step from the feeder, relative to the last chain link.

FIG. 11 shows the optimum orientation of the needle's eye relative to the last chain link. In this arrangement, the plane of the needle's eye, denoted in the Figure by reference P, must be perpendicular to major axis S of the ellipse defined by chain link L.

In the situation shown in FIG. 2A, needle 10 is positioned with eye 9 upwards and back 8 downwards, and it rotates counterclockwise about its axis. Feeder 20 is in turn located beside the needle, with its axis parallel with the needle axis, and cord 4 leaves the feeder downwards. Also feeder 20 rotates counterclockwise about the needle axis, yet with angular speed twice that of the needle. Needle 10 is radially displaced towards the stator center.

In the situation shown in FIG. 2B, needle 10 has rotated by 45°, whereas feeder 20 has rotated by 90° about needle 10 thereby bringing cord 4 in contact with back 8 of needle 10. Cord 4 is deposited onto needle 10 near (shortly before or shortly after) the end of the radial stroke (arrow C) of needle 10 towards the stator inside.

Upon a further rotation of needle 10 and feeder 20, the situation shown in FIG. 2C is reached wherein needle 10 has rotated by 90°, whereas feeder 20 has rotated by 180° and is now located on the opposite side with respect to FIG. 2A. Cord 4 is wrapped by about 90° around back 8 of needle 10.

Upon a further rotation of needle 10 and feeder 20, feeder 20 continues rotating and wraps cord 4 around the thin portion of needle 10 (FIG. 2D), that is eye 9, and reaches its final position similar to that of FIG. 2A. However, in this case, the needle is turned by 90° (i.e. the needle back is turned upwards) and cord 4 is wrapped around needle 10 and is engaged by the latter as far as the radial displacements (arrow C) are concerned. It is to be appreciated that cord wrapping takes place in portion 13 of eye 9.

Figure 3:
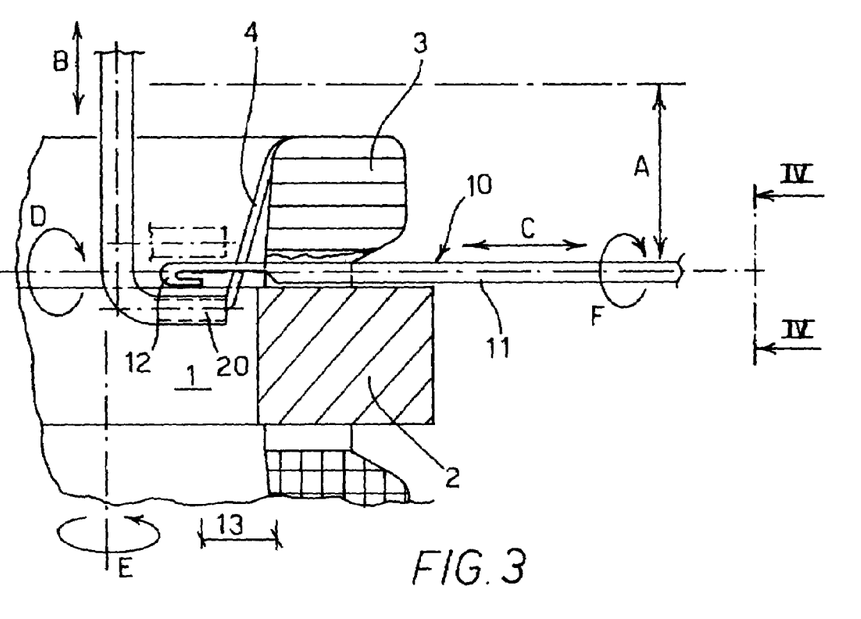
FIG. 3 is a fragmentary cross-sectional view showing part of a stator and the relative positions of the needle and the cord feeder when the needle is below the coil to be laced.
Figure 4A:
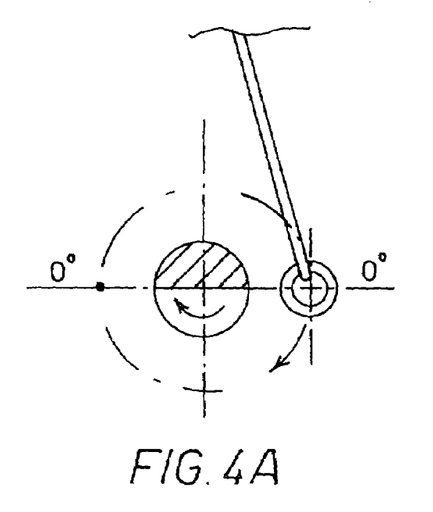
FIGS. 4A through 4E show the winding lacing steps according to the method of the invention when the needle is below the coil.
Figure 4B:
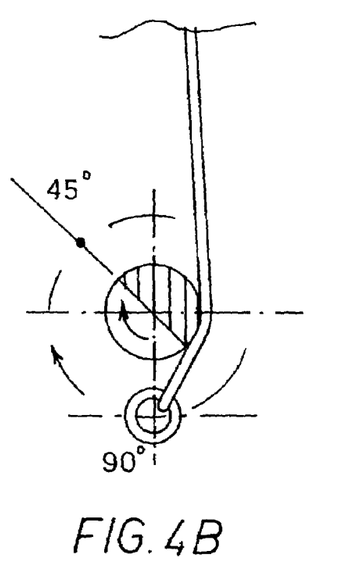
Figure 4C:
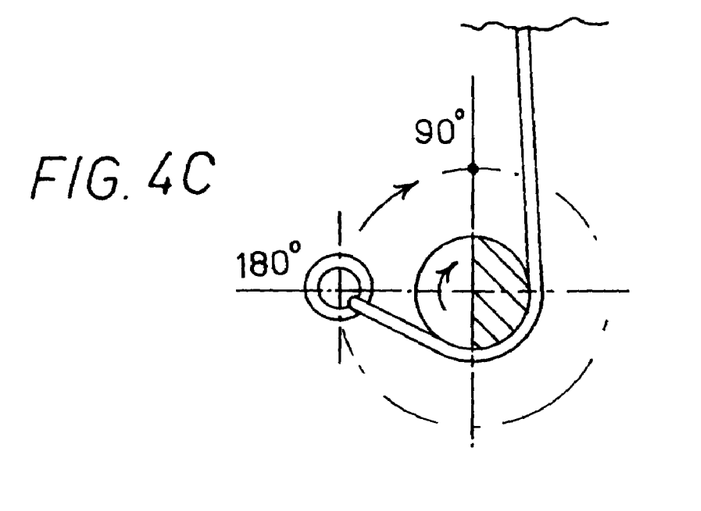
Figures 4D, 4E:
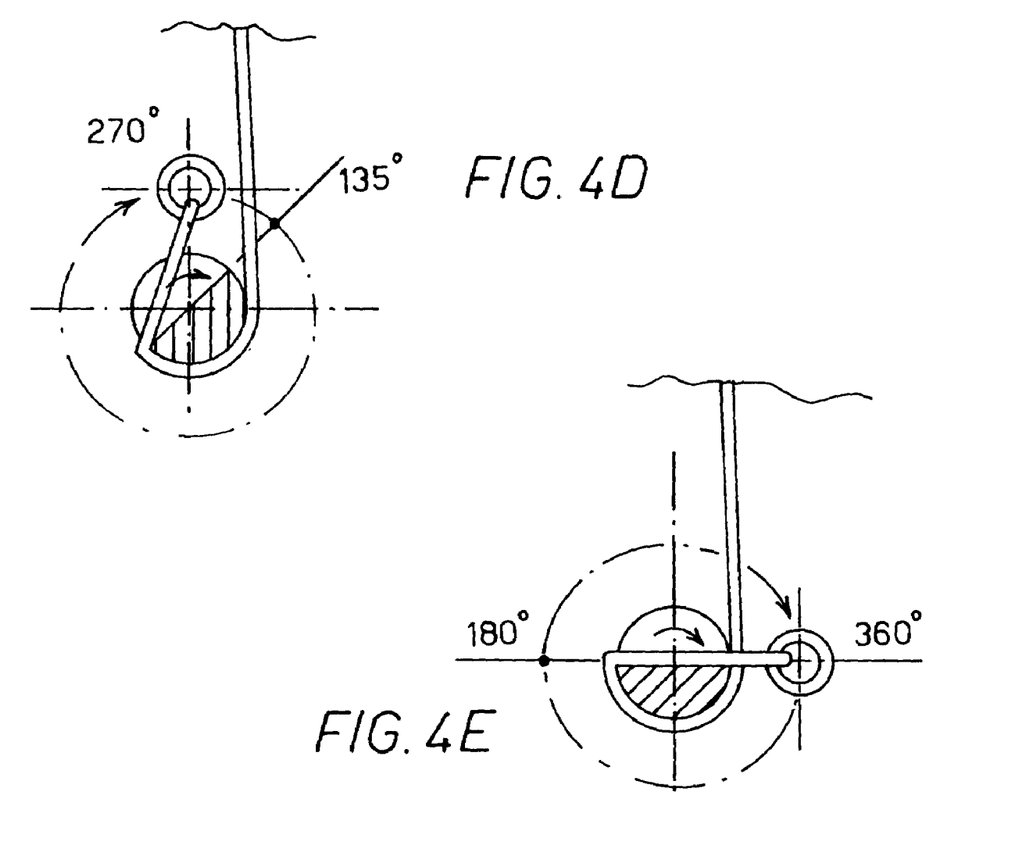

FIGS. 3 and 4A through 4E, the latter being cross sectional views taken along line IV-IV in FIG. 3, show the lacing steps when needle 10 is below the coil in the gap between adjacent slots. Being the arrangement specular, with needle 10 and feeder 20 rotating clockwise, the considerations made above apply also to these Figures.

Figure 5A:
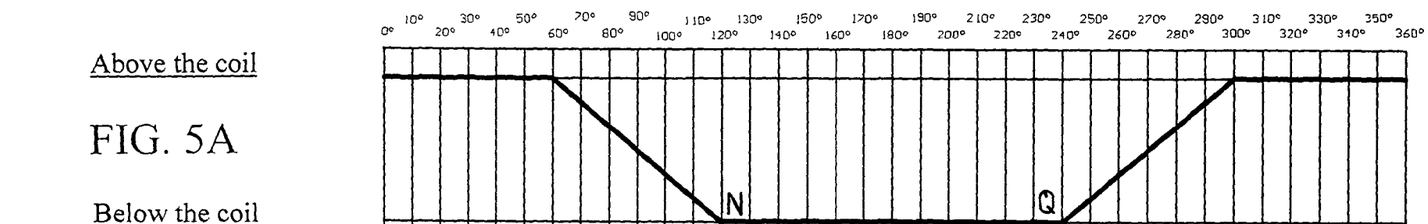
FIGS. 5A, 5B and 5C are graphs respectively showing the axial and radial strokes of the needle and the rotation (angular position) of the primary shaft controlling the rotation of the cord feeder and the needle.
Figure 5B:
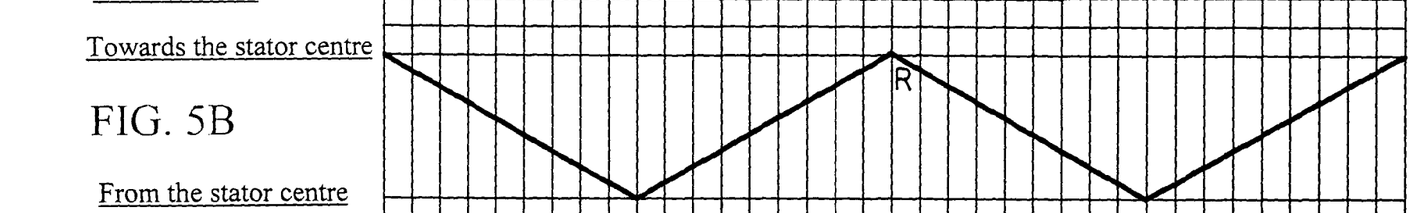
Figure 5C:
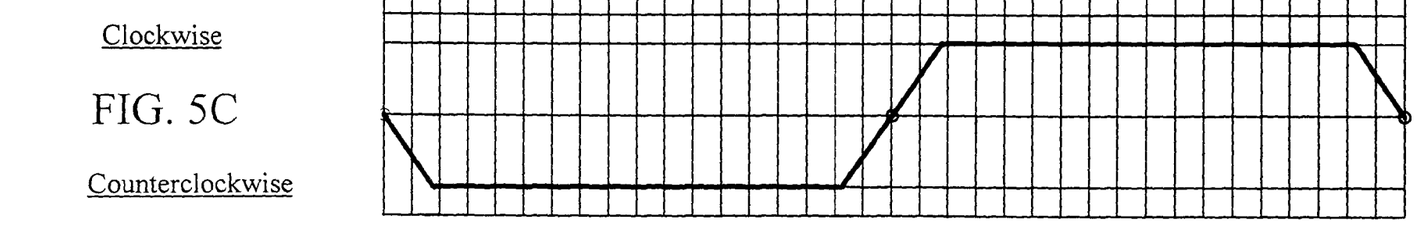

FIGS. 5A, 5B and 5C are graphs respectively showing the axial and radial displacements of the needle (FIGS. 5A, 5B) and the angular displacements of the primary shaft controlling the needle and feeder rotation.

More particularly, graph 5A shows the axial stroke of the needle over a cycle extending over an arc of 360° from a position above the coil to be laced to a position below the coil.

Graph 5B shows the radial stroke of the needle over the same cycle of 360°, comprising portions in which the needle move towards and away from the stator center with constant angular speed.

Lastly, graph 5C shows the rotation, over a cycle of 360°, of the primary shaft controlling the needle and feeder rotation, the upper graph portion referring to clockwise rotation and the lower portion to counterclockwise rotation.

Those Figures show that, in the interval between points N and Q in the graph of FIG. 5A, where the needle is below the coil, the radial movement of the needle brings it towards the stator center (point R in the graph of FIG. 5B) and then away from the center. At that dead point, the needle has rotated by 180°, as shown before, and the feeder has rotated by twice that angle, i.e. by 360°. As an indication, the graph of FIG. 5C shows that the 180°rotation of the needle and the 360° rotation of the feeder take place within an interval of about 35°, in the 360° cycle, about said dead point.

Figures 6A, 6B:
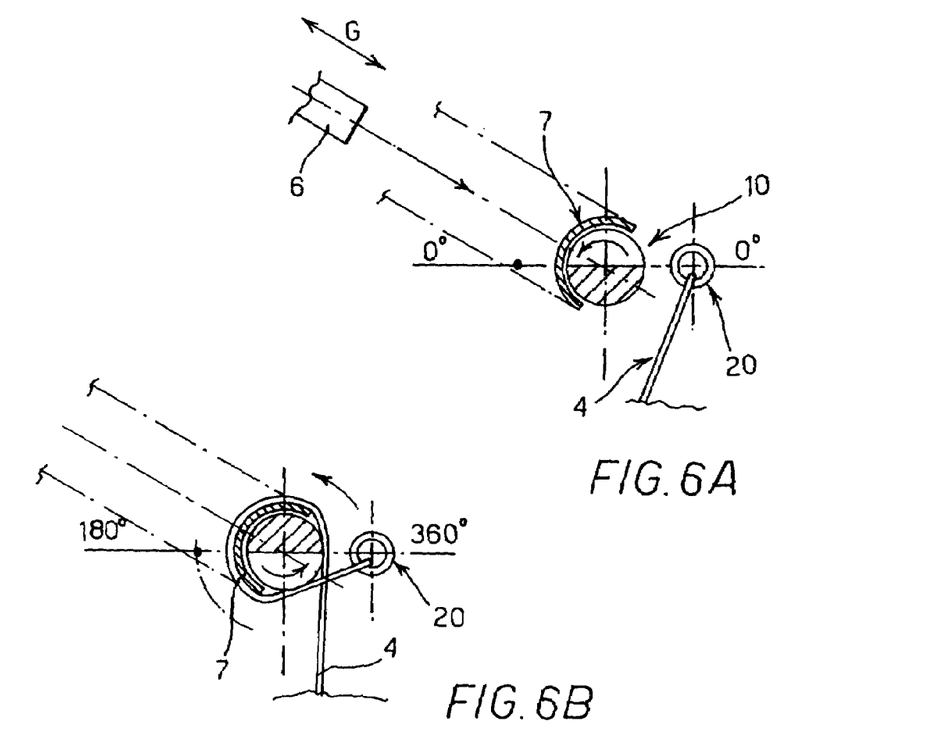
FIGS. 6A through 6C show in succession the cord hooking modalities at the end of the lacing cycle.
Figure 6C:
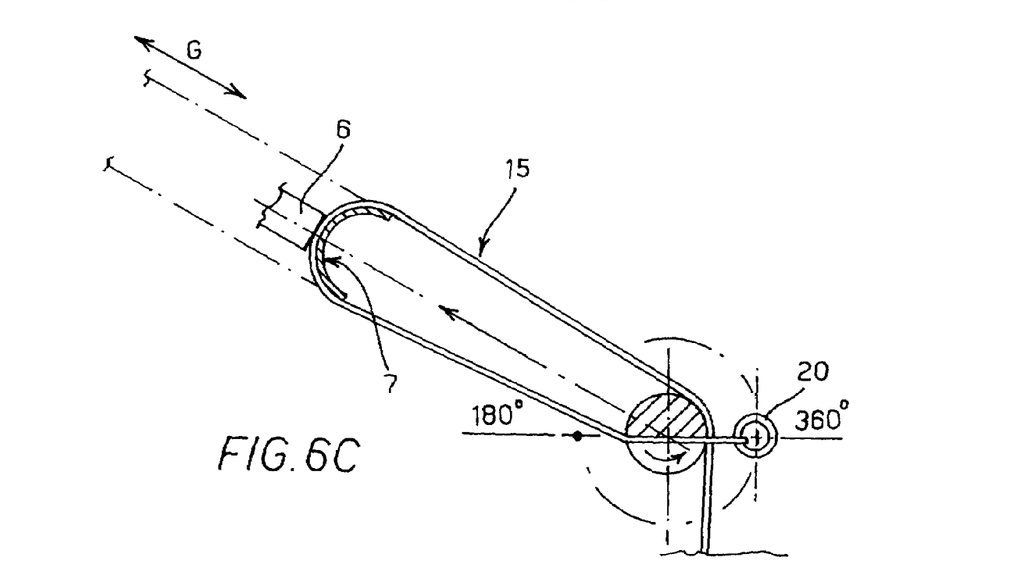

Turning now to FIGS. 6A to 6C, the cord locking at the end of the lacing cycle is now disclosed.

When the lacing cycle is over, knotting is performed, for instance as disclosed in EP-A-1 081 831. When the lacing cycle is almost over, with the needle in the axial stroke above the coil, while feeder 20 is about to perform the last rotation about needle 10 (see FIG. 6A showing a situation similar to FIG. 2A), an external arc-shaped engaging member (or hook) 7 intervenes and radially moves (in direction G shown in the Figures) towards needle 10, so that cord 4 is deposited and wrapped on said arc-shaped member 7 (FIG. 6B). At the cycle end (FIG. 6C), member 7 is moved radially away from the needle (radial return stroke) up to an abutment 6 blocking cord 4, the cord terminal being automatically located within the needle's eye for the subsequent cycle. The cord is then cut at point 15.

In the lacing method of the invention, a twisting of the cord chain being formed is also obtained (due to the wrapping of the cord on the needle), which twisting blocks or tightens each chain stitch formed, thereby obtaining a tighter lacing.

The movements required by the method of the invention are synchronous movements, which can be performed by both mechanical and electromechanical systems, and this allows in any case incrementing the lacing speed without negatively affecting the life of the moving parts.

Moreover, the physical set-up of the needle and the associated feeder is extremely simplified.

Advantageously, the feeder and the needle are operated through a single driving device.

The method of the invention allows lacing very irregular windings or windings with a great angular spacing between the slots, such as for instance the stator windings of new generation brushless motors. Moreover, the method allows performing the lacing even changing the stator rotation direction, for instance first in clockwise direction and then in counterclockwise direction, to perform two or more lacing cycles on a same coil portion.

Moreover, the apparatus mechanics is lighter, thereby allowing increasing the operation speed, the set-up operations by the operator are simplified and the lacing is firmer thanks to the twisting carried out on each chain or loop of the lacing cord.

Moreover, the use of a rotating feeder solves a number of problems associated with the cord failing to meet the needle's eye due to one ore more of the following situations: non perfectly uniform coil heads, great thickness of the copper wire of the coil, irregular coils as is for instance the case of multipole windings.

Figure 7:
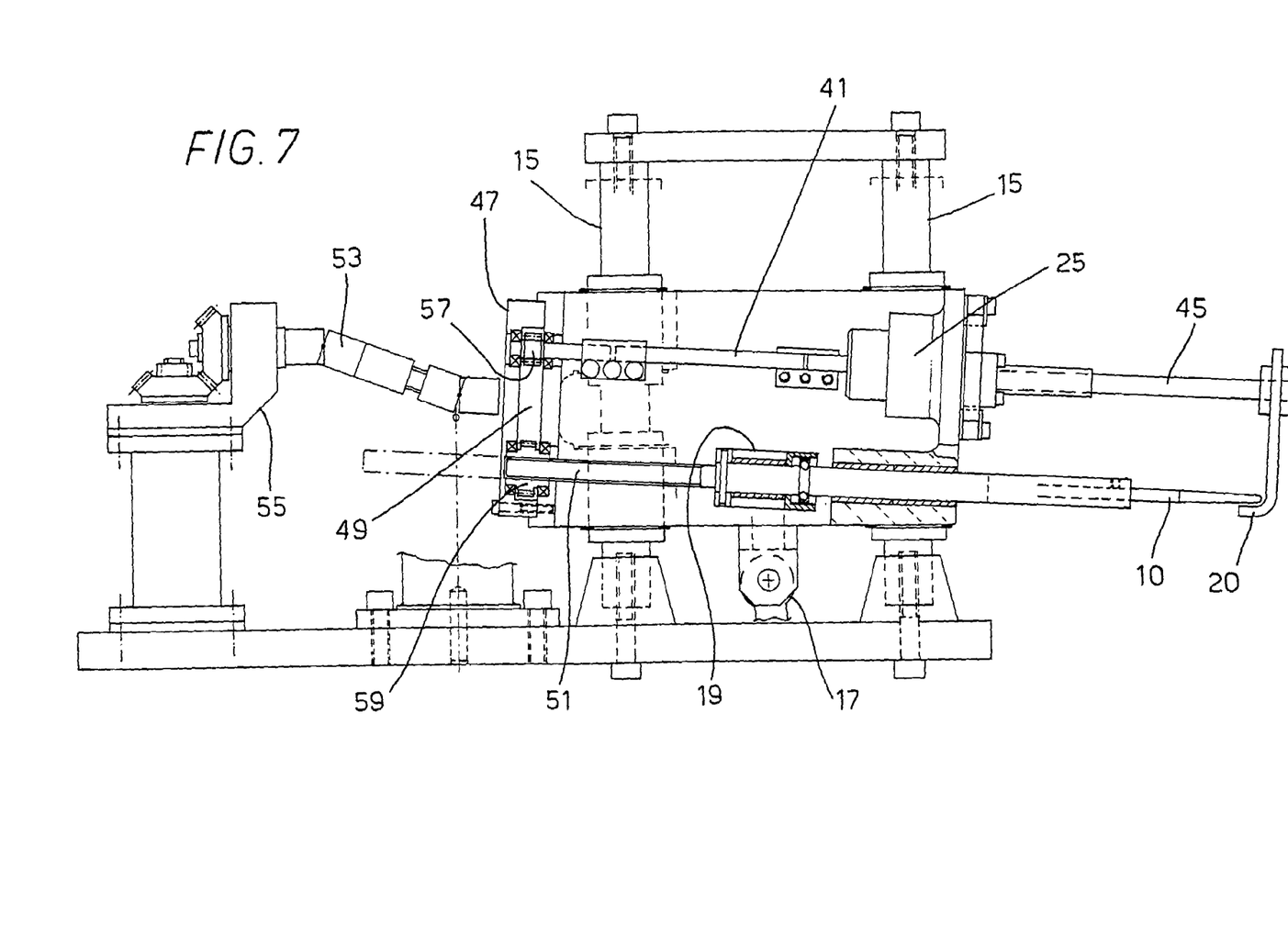
FIG. 7 is a side view of a coil lacing apparatus according to the invention.
Figure 8:
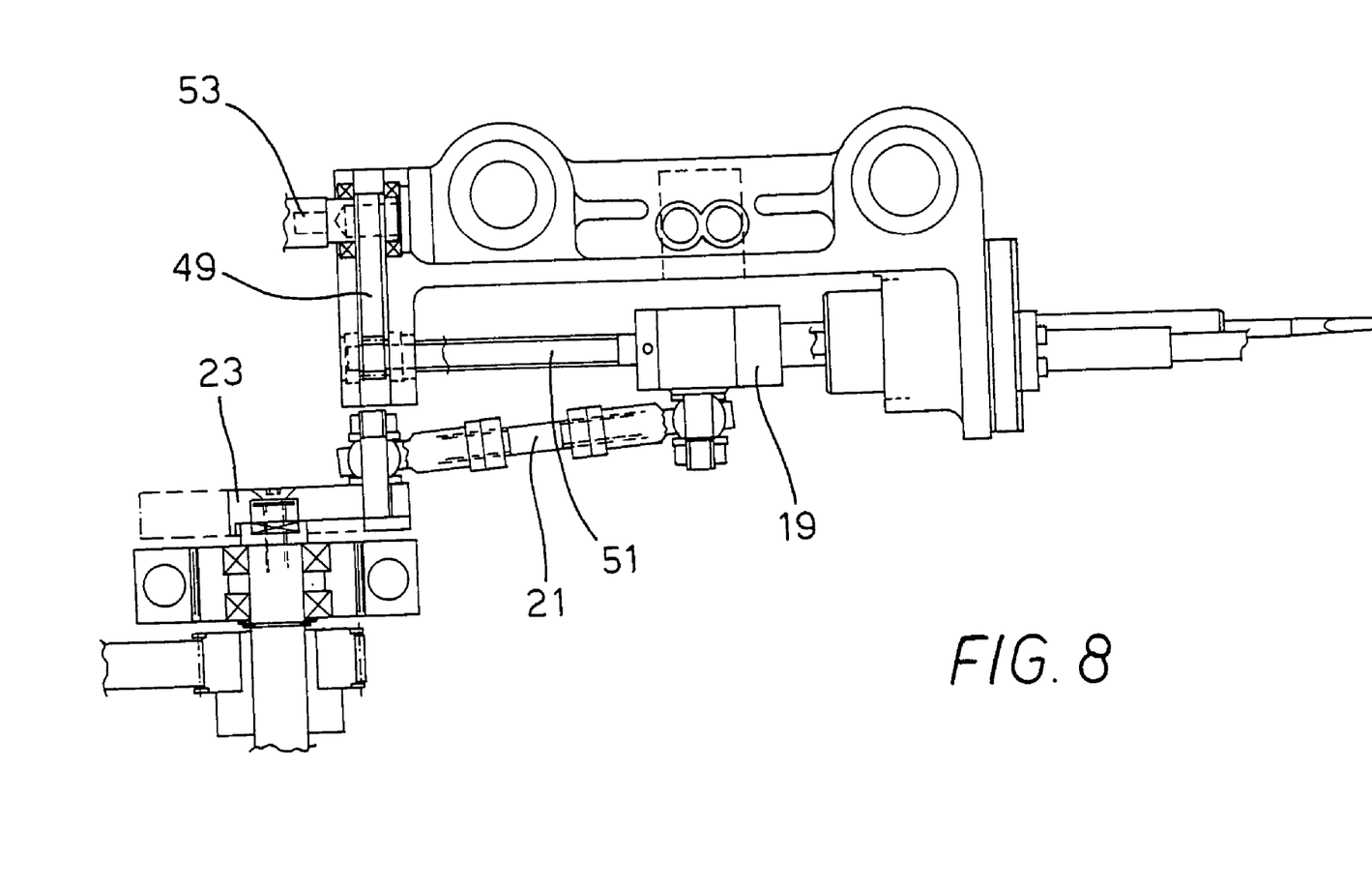
FIG. 8 is a top view of the apparatus shown in FIG. 7.

Referring to FIG. 7, the apparatus for carrying out the method of the invention comprises a needle 10 and a feeder 20 carried by a support vertically movable along guides 15. An eccentric control assembly 25 controls the rotational movement of feeder 20 about the needle axis. A connecting rod—crank assembly, of which connecting rod end 17 is shown in FIG. 7, vertically moves the support along guides 15, whereas a crank 23 (FIG. 8), hingedly connected to a sleeve 19 through a transmission 21 so as to reciprocate, generates the needle radial movement into and out of the coil. Eccentric control assembly 25 of feeder 20 is shown in greater detail in FIG. 9, which shows a primary shaft 41, from which said assembly is driven, and a seat 43 in which support 45 (shown in FIG. 7) of feeder 20 is secured.

Figure 10:
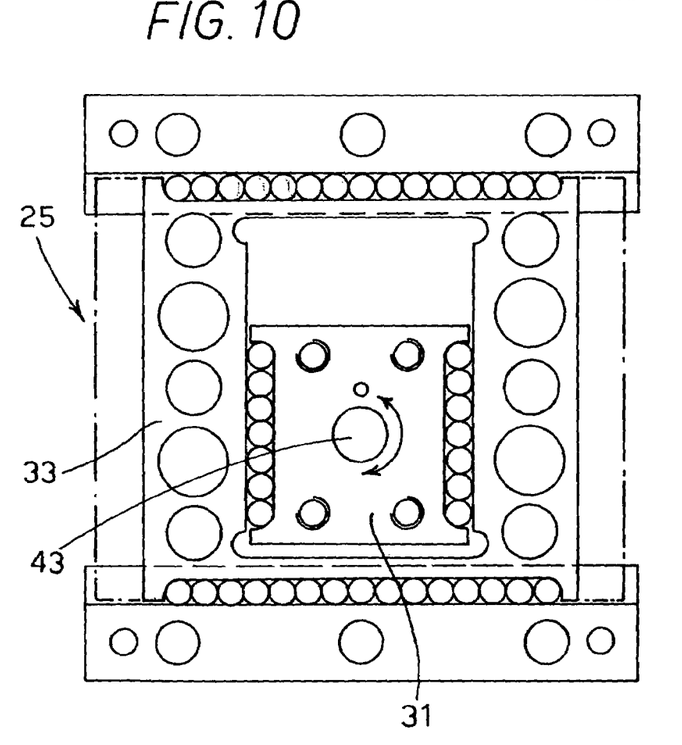
FIG. 10 is a front view of the detail shown in FIG. 9.

FIG. 10 shows a detail of the arrangement generating the rotary movement of feeder 20 about needle 10. That arrangement exploits the combined displacement of two plates 31 and 33, which are slidable on roller bearings in vertical and horizontal direction, respectively, so as to make the bent end of feeder 20 rotate about the axis of needle 10 without upsetting the feeder tube, while keeping vertical the axis of the feeder portion secured to said support 45.

Figure 9:
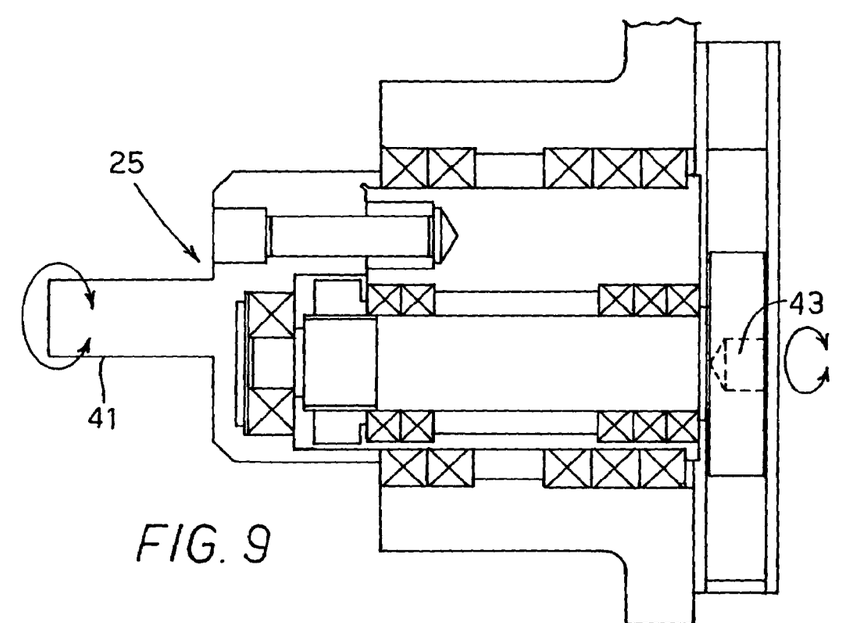
FIG. 9 is a cross-sectional side view of the eccentric control unit shown in FIG. 7.

Primary shaft 41 of the eccentric assembly is driven by a distributor 47 in correspondence of which the alternating rotation of a crescent-shaped gear 49 is shared among said shaft 41 and shaft 51 supporting needle 10.

Said crescent-shaped gear 49 is driven into rotation, alternately in clockwise and counterclockwise direction, by a universal joint 53 arranged at the output from a transmission assembly 55 driven by an oscillator, not shown.

Shaft 41 controlling eccentric assembly 25 and shaft 51 of needle 10 mesh with said crescent-shaped gear 49 through corresponding gears 57, 59, suitably dimensioned so as to achieve the proper reduction ratio and to make shafts 41 and 51 rotate by the desired angle.

Preferably, all movements are imparted by a single motor, even if using several electronically controlled motors, e. g. one for each movement, is within the scope of the invention. Clearly, in the latter case the needle and the feeder can easily be made to perform both rotational and translational variable speed movements, so as to suit the different situations in a same winding. For instance, the ratio of the needle and feeder rotations can be varied depending on whether the needle is above or below the coil, or yet depending on whether the stator is rotationally indexed clockwise or counterclockwise.

Lastly, it is to be appreciated that generally the apparatuses concerned have an upper and a lower winding of similar shape and size. In such case the apparatus of the invention will comprise, in conventional manner, two sets of the components described above, operating in specular manner to lace both windings at the same time.

It is clear that the above description is given only by way of non-limiting example, and that changes and variations are possible without departing from the scope of the invention.

What I claim is:

1. A method of lacing a generally toroidal coil comprising the steps of:
   supporting said coil on an angularly rotating support;
   providing a needle having an open eye, said needle having an axis and being rotatable about its axis and being radially and axially movable relative to said coil to enter and leave a region defined inside a perimeter of said coil;
   providing a feeder source for providing a lacing cord;
   wrapping said lacing cord all around the needle's eye while the needle is moving radially relative to said coil, before the needle leaves the region defined inside the perimeter of said coil.

2. A method as claimed in claim 1, further including the steps of:
   positioning said feeder relative to said needle so that a feeder axis is generally parallel with the needle axis;
   rotating said feeder about the axis of said needle with an average angular speed that is twice an average angular speed of rotation of said needle about its axis;
   depositing said cord into engagement with the needle's eye, near the end of a radial stroke of said needle towards the center of said coil.

3. A method as claimed in claim 2, wherein the angular speed of said feeder and said angular speed of rotation of said needle about its axis are constant.

4. A method as claimed in claim 2, wherein the said wrapping of the said cord onto said needle is carried out during a feeder rotation by 360° and a needle rotation by 180°.

5. A method as claimed in claim 2, further including the steps of:
   performing a tying knot;
   hooking said cord at a cycle end;
   automatically positioning said cord end into said needle's eye and cutting said cord.

6. A method as claimed in claim 1, wherein said coil is a stator coil in a brushless electric motor.

7. A method as claimed in claim 1, wherein said lacing further includes a step of changing said coil direction and a support of said supporting step is rotated both clockwise and counterclockwise during the same lacing work-cycle, to perform two or more lacing cycles on a same coil portion.

8. Apparatus for lacing a generally toroidal coil, comprising:
   a support for said coil, wherein said support is capable of angularly rotating the coil;
   a needle having an open eye, said needle having an axis and being rotatable about its axis and being radially and axially movable relative to said toroidal coil to enter and leave the region defined inside a perimeter of said coil;
   a feeder source for providing a source of lacing cord; and
   an eccentric control assembly for displacing said feeder about the axis of said needle at a speed twice a rotation speed of the needle;
   whereby said lacing cord is wrapped all around the needle's eye of said needle.

9. An apparatus as claimed in claim 8, wherein said eccentric control assembly includes two plates slidable in vertical and horizontal direction, respectively.

* * * * *